(12) United States Patent  
Kuhlman

(10) Patent No.: US 9,045,120 B2  
(45) Date of Patent: Jun. 2, 2015

(54) PEDAL OSCILLATION SUPPRESSION

(75) Inventor: Ryan Kuhlman, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 790 days.

(21) Appl. No.: 13/289,106

(22) Filed: Nov. 4, 2011

(65) Prior Publication Data

US 2013/0111897 A1     May 9, 2013

(51) Int. Cl.
| | | |
|---|---|---|
| *B60T 13/18* | (2006.01) | |
| *B60T 8/42* | (2006.01) | |
| *B60T 8/44* | (2006.01) | |
| *B60T 8/32* | (2006.01) | |
| *B60T 8/40* | (2006.01) | |
| *B60T 8/48* | (2006.01) | |

(52) U.S. Cl.
CPC ............ *B60T 8/4291* (2013.01); *B60T 8/448* (2013.01); *B60T 8/3265* (2013.01); *B60T 8/4068* (2013.01); *B60T 8/4872* (2013.01)

(58) Field of Classification Search
CPC ... B60T 8/3265; B60T 8/4068; B60T 8/4291; B60T 8/4872; B60T 8/448
USPC ................. 60/538, 545, 555, 543, 591, 592; 92/60.5
See application file for complete search history.

(56) References Cited

U.S. PATENT DOCUMENTS 5,597,535 A * 1/1997 Schaedlich et al. ............ 422/88
2003/0140876 A1* 7/2003 Yang et al. ................. 123/90.12

FOREIGN PATENT DOCUMENTS

| | | |
|---|---|---|
| DE | 3621348 | 1/1988 |
| DE | 19544221 | 6/1997 |
| DE | 19731413 A1 | 1/1999 |
| EP | 0379329 | 7/1990 |
| FR | 2860474 | 4/2005 |
| WO | 2010/083925 | 7/2010 |
| WO | 2010/091756 | 8/2010 |
| WO | WO 2010091756 A1 * | 8/2010 |

OTHER PUBLICATIONS

International Search Report and Written Opinion for Application No. PCT/US2012/062924 dated Jan. 22, 2013 (16 pages).

* cited by examiner

*Primary Examiner* — Dwayne J White
*Assistant Examiner* — Logan Kraft
(74) *Attorney, Agent, or Firm* — Michael Best & Friedrich LLP

(57) ABSTRACT

A vehicle brake system. The system includes a wheel brake, a brake pedal, a master cylinder, a first valve, a second valve, a pump, a pressure sensor, a pressure controlling device, and a controller. The master cylinder increases a pressure of a brake fluid in the brake system based on a user depressing the brake pedal. The pump pumps the brake fluid through the first valve to the wheel brake and to draw the brake fluid from the wheel brake through the second valve. The pressure sensor senses a pressure of the brake fluid in the brake system. The pressure controlling device reduces a pressure of the brake fluid at the master cylinder. The controller operates the first and second valves, the pump, and the pressure controlling device during a controlled braking event.

14 Claims, 6 Drawing Sheets

PEDAL OSCILLATION SUPPRESSION

BACKGROUND

The invention relates to a system for reducing or eliminating feedback oscillation in a hydraulic system. More specifically, the invention relates to a system for reducing oscillations of a brake pedal in a vehicle during anti-lock braking operations.

Vehicle brake systems are hydraulic systems in which pressure put on a brake pedal by the vehicle's driver is transferred to the vehicle's brakes by a hydraulic fluid. The brake system also includes a pump and valves which are operated by an anti-lock brake system which detects when a wheel is beginning to lock up, and oscillates the hydraulic pressure at the brake to prevent the wheel from locking up. The oscillation of hydraulic pressure is fed back through the system to the brake pedal where the driver detects an oscillation of the brake pedal.

SUMMARY

In one embodiment, the invention provides a vehicle brake system. The system includes a wheel brake, a brake pedal, a master cylinder, a first valve, a second valve, a pump, a pressure sensor, a pressure controlling device, and a controller. The master cylinder is coupled to the brake pedal and configured to increase a pressure of a brake fluid in the brake system based on a user depressing the brake pedal. The first valve has an open position in which the brake fluid flows through the valve and a closed position where the brake fluid is prevented from flowing through the valve. The second valve has an open position in which the brake fluid flows through the valve and a closed position where the brake fluid is prevented from flowing through the valve. The pump is configured to pump the brake fluid through the first valve to the wheel brake and to draw the brake fluid from the wheel brake through the second valve. The pressure sensor is configured to sense a pressure of the brake fluid in the brake system. The pressure controlling device is configured to reduce a pressure of the brake fluid at the master cylinder. The controller is configured to receive an indication of the pressure of the brake fluid from the pressure sensor, to operate the first and second valves, the pump, and the pressure controlling device during a controlled braking event.

In another embodiment the invention provides a method of operating a vehicle brake system during a controlled braking event, including determining that a controlled braking event is required, sensing a pressure of a fluid at a master cylinder, operating a pump, modulating a plurality of valves to alternatively decrease a pressure of the fluid at a brake and increase the pressure of the fluid at the brake to execute the controlled braking event, and reducing a pressure of the fluid at a master cylinder during execution of the controlled braking event.

Other aspects of the invention will become apparent by consideration of the detailed description and accompanying drawings.

DETAILED DESCRIPTION

Figure 1:
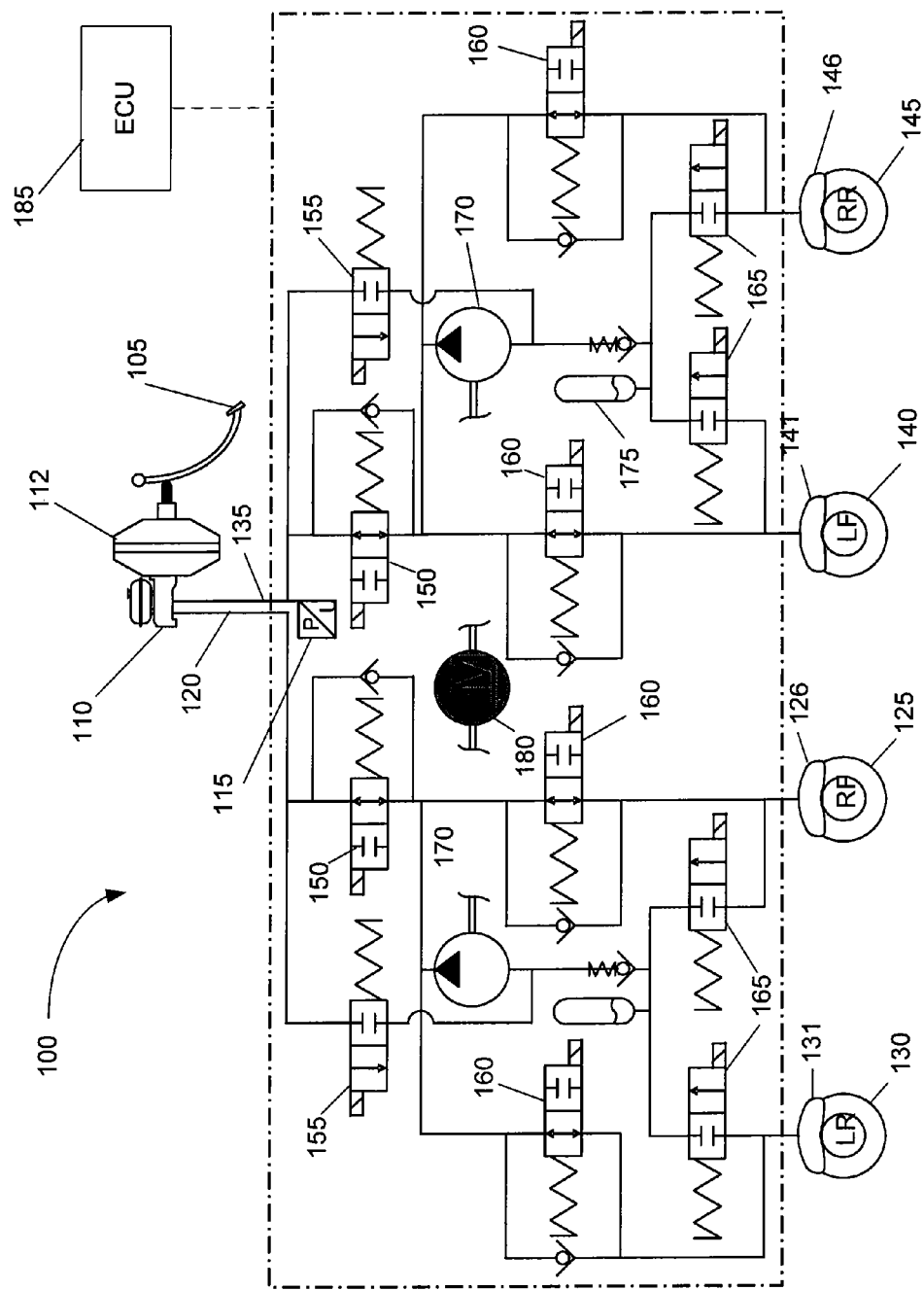
FIG. 1 is a schematic diagram of a hydraulic brake system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components, may be utilized to implement the invention. As described in subsequent paragraphs, the specific configurations illustrated in the drawings are intended to exemplify embodiments of the invention and other alternative configurations are possible. In the figures, solid lines are used to depict hydraulic connections and dashed lines are used to depict electrical connections.

FIG. 1 shows a hydraulic brake system 100. The brake system 100 includes a brake pedal 105, a master cylinder 110, a vacuum booster 112, and a pressure sensor 115. The master cylinder 110 provides brake fluid to a first line 120 serving a right front wheel 125 (having a brake 126) and a left rear wheel 130 (having a brake 131) of a vehicle, and to a second line 135 serving a left front wheel 140 (having a brake 141) and a right rear wheel 145 (having a brake 146) of the vehicle. Each line 120 and 135 includes a change-over valve 150, a pre-charge valve 155, and a pair of inlet valves 160 (first valves) and outlet valves 165 (second valves) (each wheel is associated with one inlet valve 160 and one outlet valve 165). Each line 120 and 135 also includes a pump 170 and an accumulator 175. A single pump motor 180 drives both of the pumps 170.

When an operator steps on the brake pedal 105, brake fluid is supplied to the system 100 by the master cylinder 110 which in turn provides brake fluid to the brakes 126, 131, 141, and 146 of the wheels 125, 130, 140, and 145. The pressure sensor 115 senses a requested braking torque or pressure based on the vehicle operator's actuation of the brake pedal 105, and provides an indication of the pressure to an electronic control unit (ECU) 185 of the vehicle.

The ECU 185 determines (based on readings from various sensors such as wheel speed sensors) when a controlled braking event is required, and controls the valves 160 and 165 and the pumps 170 of the brake system 100 to execute the controlled braking event. Controlled braking events include vehicle stability and anti-lock braking functions, and can execute on one or more brakes at a time. For example, during an anti-lock braking event, the ECU 185 turns on the pumps 170, and modulates the inlet and outlet valves 160 and 165 to increase and decrease the braking torque on a wheel. That is, when the ECU 185 detects that a wheel is locking up (or nearly locking up), the ECU 185 closes the inlet valve 160 associated with the wheel, and opens the outlet valve 165 associated with the wheel. This reduces the pressure of the brake fluid at the brake, releasing the wheel. The ECU 185 then switches, opening the inlet valve 160 and closing the outlet valve 165 to apply more pressure to the brake. The modulation of the valves 160 and 165 also increases and decreases the pressure of the brake fluid at the master cylinder 110. This cycling of pressure is then transferred to the brake pedal 105, causing the pedal 105 to "bounce." This bounce can be annoying or unsettling to the operator of the vehicle.

The pump 170 operates to draw brake fluid away from the brake when the outlet valve 165 is opened, and forces brake fluid to the brake when the inlet valve 160 is opened. Running the pump 170 results in increased pressure of the brake fluid in the system 100. To counteract this pressure and prevent the pump 170 from stalling, the pump 170 is operated at a high speed. This can result in a high noise level that is distracting and annoying to occupants of the vehicle. In addition, operating the pump 170 at high speed can lead to early failure of the pump and higher maintenance costs.

Figure 2:
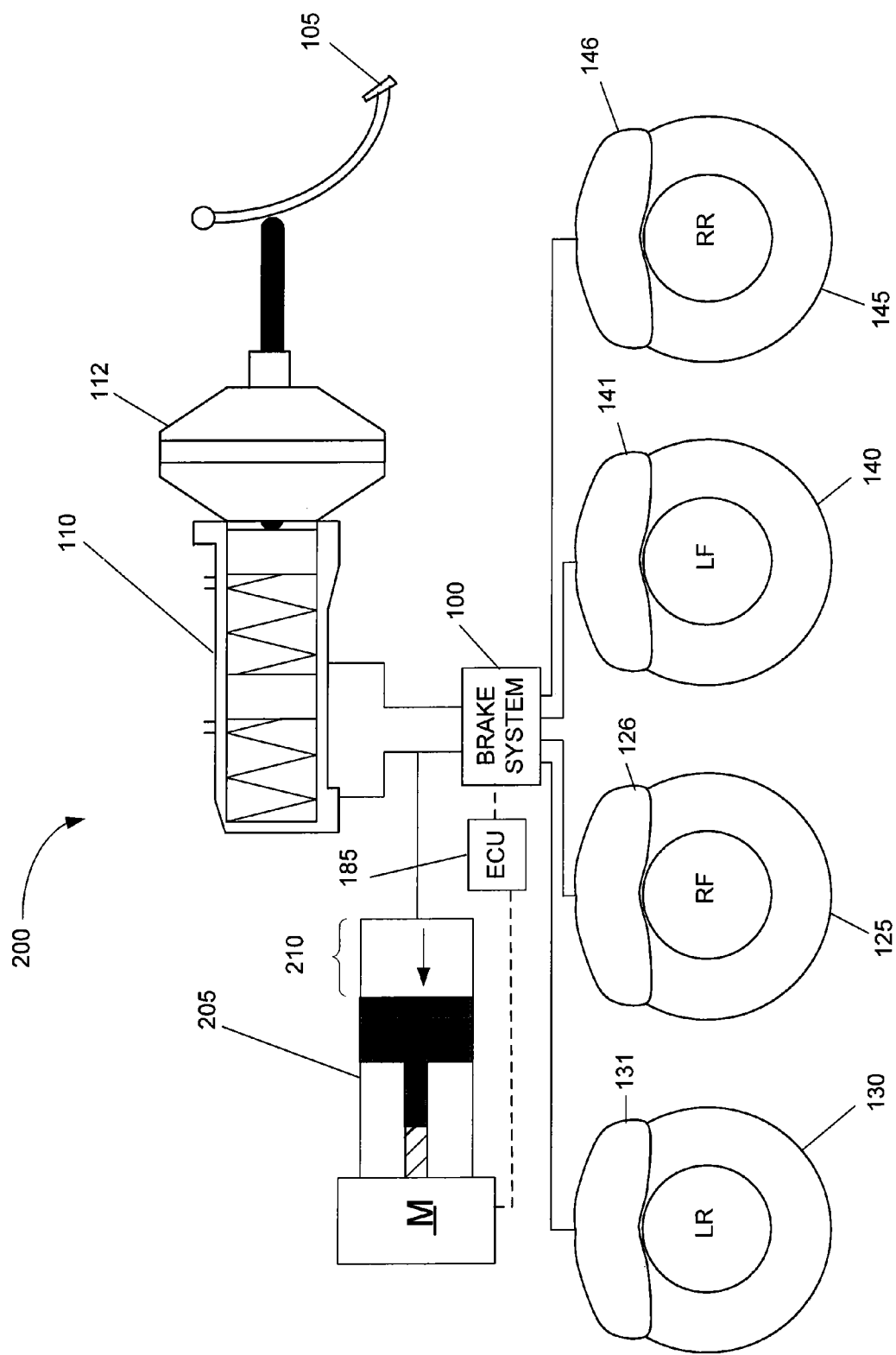
FIG. 2 is a schematic diagram of a passive volume-absorption brake system.

FIG. 2 shows a schematic representation of a passive volume-absorption brake system 200 which reduces the brake pedal bounce during ECU-controlled braking functions. The system 200 also reduces the pressure of the brake fluid in the system, allowing the pump 170 to run at a slower speed, reducing noise and wear on the pump.

In addition to the components shown in FIG. 1, the passive volume-absorption braking system 200 also includes a volume manipulation device (VMD) 205 (e.g., a pressure controlling device). The VMD 205 is controlled by the ECU 185 and operates to modify the amount of brake fluid in the system 200. When the ECU 185 initiates a braking event, the ECU 185 controls the VMD 205 to open to a fixed volume 210, removing a quantity of the brake fluid from the system 200. The removal of brake fluid from the system 200 results in a lower pressure in the system 200 allowing the pump 170 to run slower, and reducing the magnitude of the brake pedal bounce. Once the ECU braking event ends, the ECU 185 closes the VMD 205. Closing the VMD 205 returns brake fluid back to the system 200.

Figure 3:
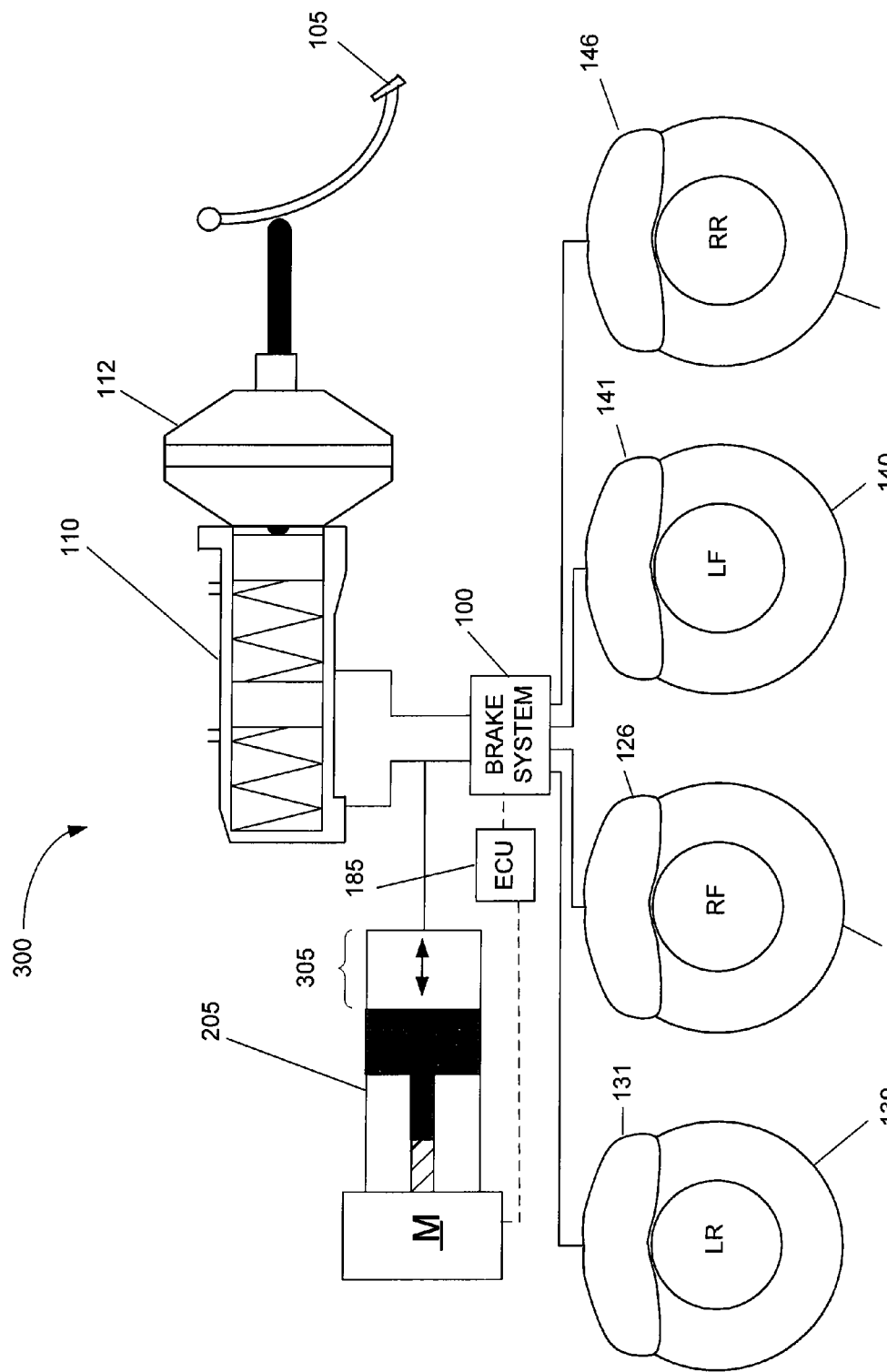
FIG. 3 is a schematic diagram of an active volume-absorption brake system.

FIG. 3 shows a schematic representation of an active volume-absorption brake system 300. The brake system 300 reduces or eliminates the brake pedal bounce during ECU-controlled braking functions. Like brake system 200, the system 300 reduces the pressure of the brake fluid in the system, allowing the pump 170 to run at a slower speed, reducing noise and wear on the pump. During ECU-controlled braking events, the ECU 185 controls the VMD 205 to reduce the volume of brake fluid in the system 300. In addition, the ECU 185 detects the pressure in the system 300 (i.e., via the pressure sensor 115). The ECU 185 modulates the VMD 205 to continuously adjust the volume 305 of brake fluid removed from the system 300 to maintain a constant pressure at the master cylinder 110. By maintaining the pressure at the master cylinder 110, the brake pedal bounce is greatly reduced or even completely eliminated. Once the ECU braking event ends, the ECU 185 closes the VMD 205 returning the brake fluid back to the system 300.

Figure 4:
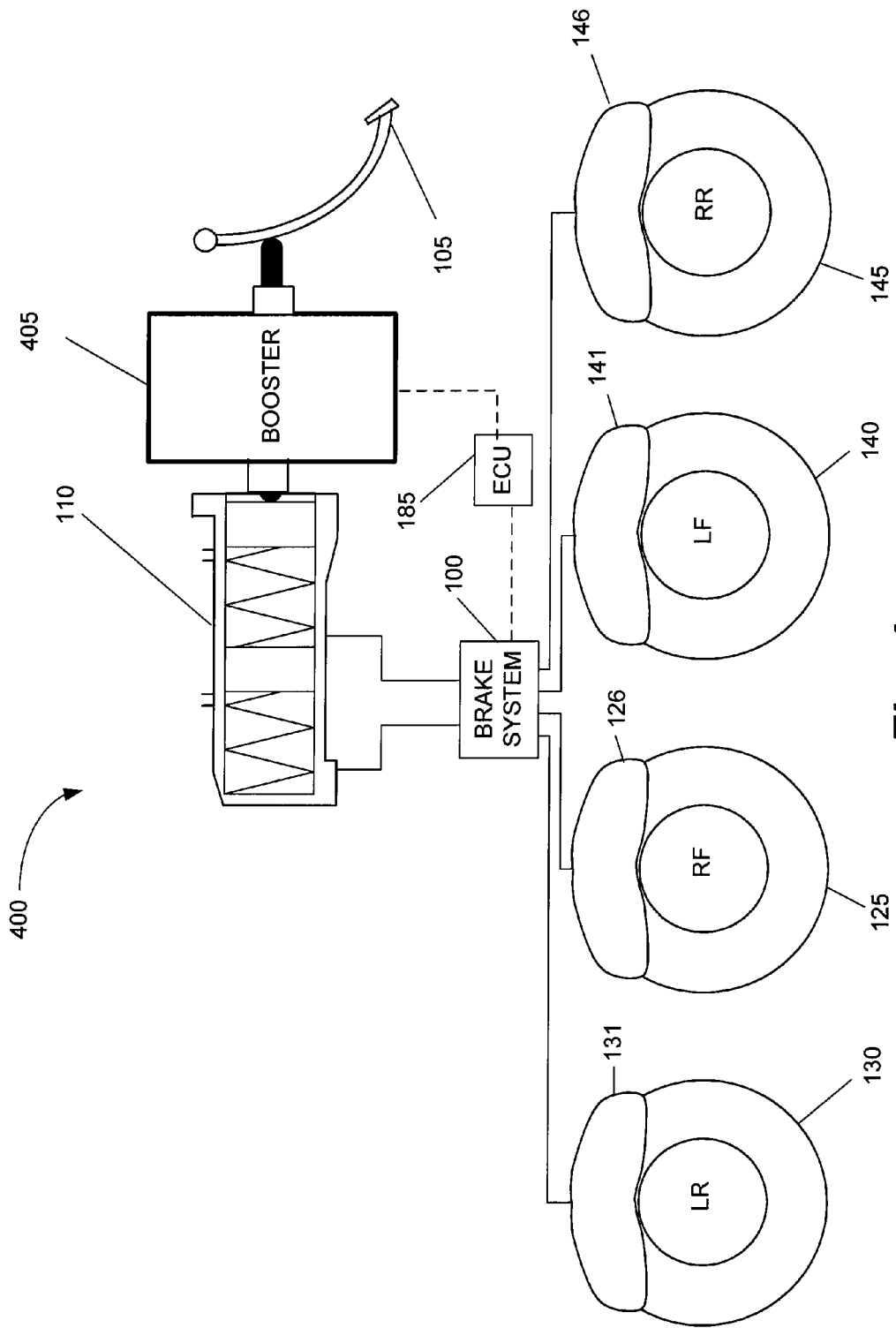
FIG. 4 is a schematic diagram of an active force-management brake system.

FIG. 4 shows an embodiment of an active force management brake system 400 which reduces the pressure of brake fluid in the system 400 during ECU-braking events. The system 400 includes a controllable assist booster (CAB) 405 (e.g., a pressure controlling device) in place of the vacuum booster 112. The CAB 405 boosts the pressure applied by an operator to the brake pedal 105. Thus, the operator uses less force to operate the brakes of the vehicle. During an ECU 185 braking event, the CAB 405 reduces the pressure of the brake fluid at the master cylinder 110, thus reducing the pressure in the system 400. This enables the pump 170 to operate at a lower speed, and reduces magnitude of the bounce of the brake pedal 105. Once the ECU braking event ends, the ECU 185 returns the output of the CAB 405 to its normal level based on the depression of the brake pedal 105.

Figure 5:
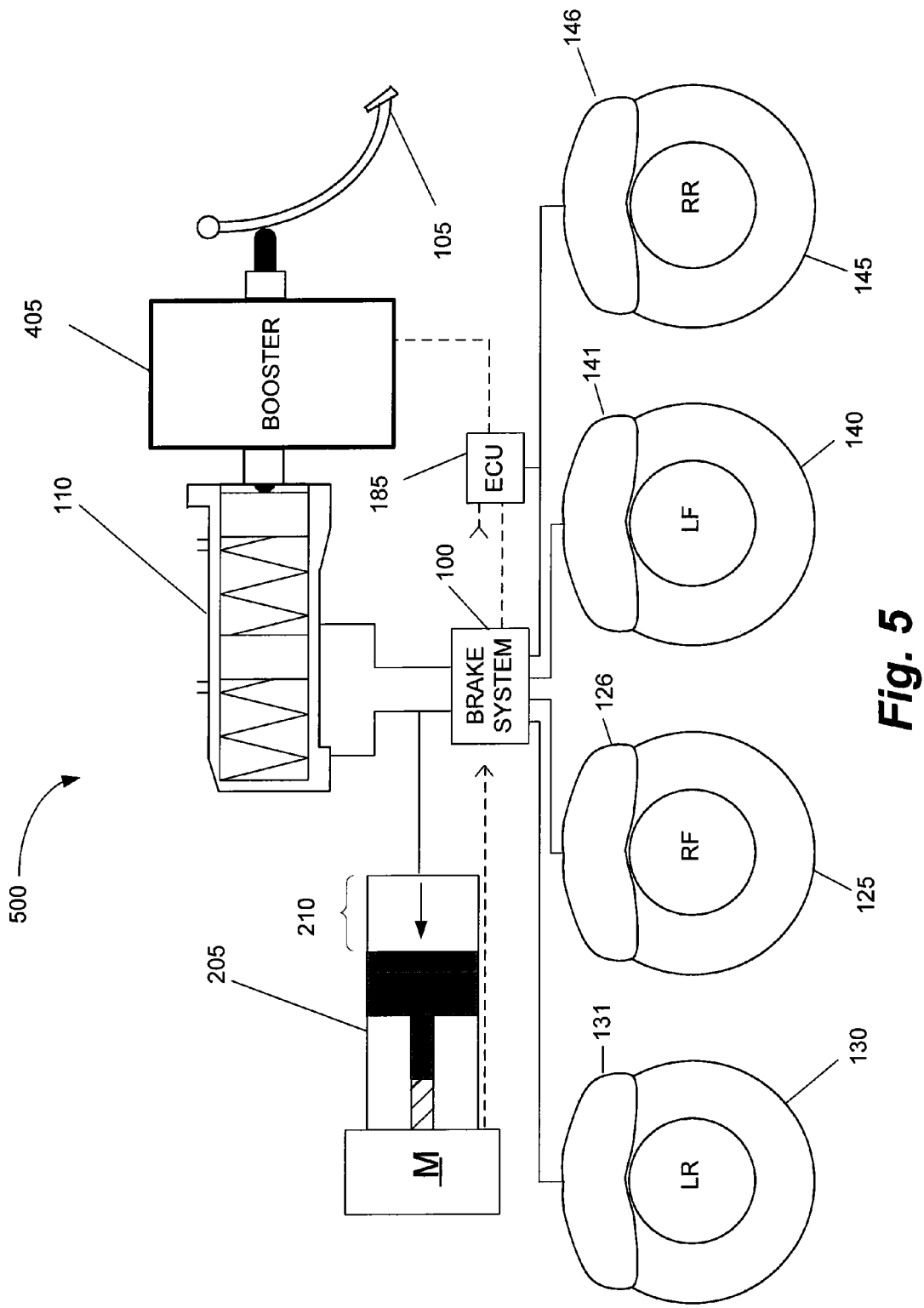
FIG. 5 is a schematic diagram of an enhanced active force-management brake system.

FIG. 5 shows an embodiment of an enhanced active force management brake system 500. The system 500 includes both a CAB 405 and a VMD 205. During ECU-braking events, the VMD 205 reduces the brake fluid in the system by a fixed volume 210, and the CAB 405 reduces the pressure of the master cylinder 110. This combination enables the pump 170 to run at a slower speed, and reduces the magnitude of the bounce of the brake pedal 105. Once the ECU braking event ends, the ECU 185 closes the VMD 205 returning the brake fluid back to the system 200. The ECU 185 also returns the output of the CAB 405 to its normal level based on the depression of the brake pedal 105.

Figure 6:
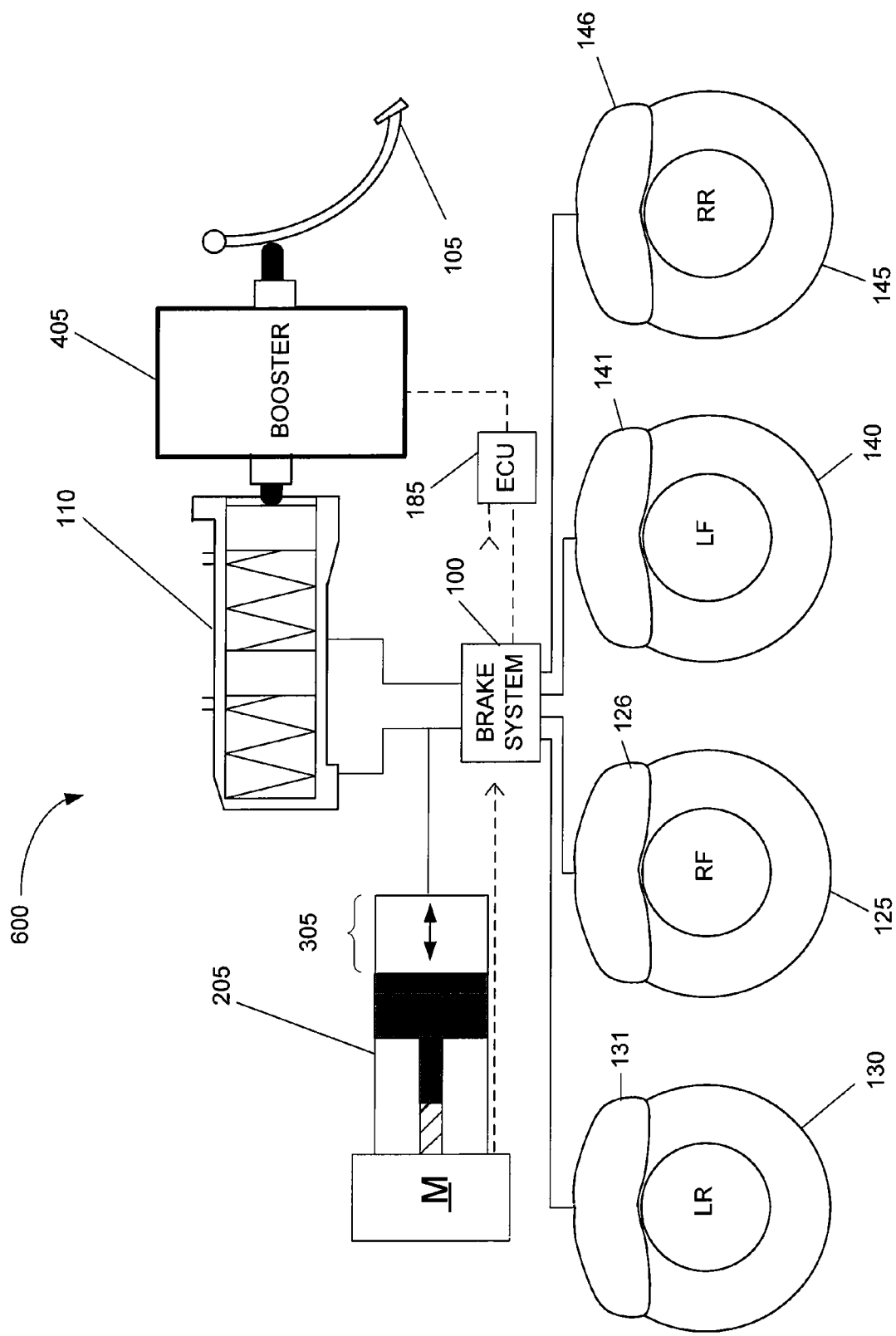
FIG. 6 is a schematic diagram of a combination active force-management and active volume-absorption brake system.

FIG. 6 shows a combination active volume absorption and active force management brake system 600. The system combines the functionality of the active absorption brake system 300 shown in FIG. 3 with the active force management brake system 400 shown in FIG. 4. The reduction in pressure in the system 600, from both the CAB 405 and the modulated reduction in brake fluid volume 305 via the VMD 205, enables the pump 170 to run slower. The active absorption of the VMD 205 to maintain a constant pressure of the brake fluid at the master cylinder 110 greatly reduces or eliminates any bounce of the brake pedal 105 caused by the ECU 185 braking event. Once the ECU braking event ends, the ECU 185 closes the VMD 205 returning the brake fluid back to the system 200, and returns the output of the CAB 405 to its normal level based on the depression of the brake pedal 105.

Various features and advantages of the invention are set forth in the following claims.

What is claimed is:

1. A vehicle brake system, the system comprising:
a wheel brake;
a brake pedal;
a master cylinder coupled to the brake pedal and configured to increase a pressure of a brake fluid in the brake system based on a user depressing the brake pedal;
a first valve having an open position in which the brake fluid flows through the valve and a closed position where the brake fluid is prevented from flowing through the valve;
a second valve having an open position in which the brake fluid flows through the valve and a closed position where the brake fluid is prevented from flowing through the valve;
a pump configured to pump the brake fluid through the first valve to the wheel brake and to draw the brake fluid from the wheel brake through the second valve;
a pressure sensor configured to sense a pressure of the brake fluid in the brake system;
a volume manipulation device configured to cause a change in a capacity of the vehicle brake system; and
a controller configured to receive an indication of the pressure of the brake fluid from the pressure sensor, to operate the first and second valves, the pump, and the volume manipulation device during a controlled braking event.

2. The system of claim 1, wherein the change in the capacity of the vehicle brake system caused by the volume manipulation device during a braking event is fixed.

3. The system of claim 2, further comprising a controllable-assist booster.

4. The system of claim 1, wherein the controller modulates the change in the capacity of the vehicle brake system caused by the volume manipulation device during the braking event to maintain the pressure of the brake fluid at the master cylinder.

5. The system of claim 3, wherein the controller modulates the change in the capacity of the vehicle brake system caused by the volume manipulation device to reduce a bounce of the brake pedal.

6. The system of claim 1, wherein the braking event is an anti-lock braking event.

7. The system of claim 1, wherein the controller is an electronic stability controller and the braking event is a vehicle stability event.

8. The system of claim 1, wherein a speed of the pump is reduced based on the reduced pressure of the brake fluid to reduce a bounce of the brake pedal.

9. A method of operating a vehicle brake system during a controlled braking event, the method comprising:
   determining that a controlled braking event is required;
   sensing a pressure of a fluid at a master cylinder;
   operating a pump;
   modulating a plurality of valves to alternatively decrease a pressure of the fluid at a brake and increase the pressure of the fluid at the brake to execute the controlled braking event; and
   reducing the pressure of the fluid at a master cylinder by using a volume manipulation device to cause a change in a capacity of the vehicle brake system during execution of the controlled braking event.

10. The method of claim 9, wherein the change in the capacity of the vehicle brake system caused by the volume manipulation device during a braking event is fixed.

11. The method of claim 9, further comprising modulating the capacity of the vehicle brake system during the braking event to maintain a pressure of the brake fluid at the master cylinder.

12. The method of claim 9, further comprising causing a change in a capacity of the vehicle brake system during the controlled braking event, and wherein the pressure is reduced by a controllable-assist booster.

13. The method of claim 12, further comprising modulating the capacity of the vehicle brake system during the controlled braking event.

14. The method of claim 9, further comprising reducing a speed of the pump based on the reduced pressure of the brake fluid to reduce a bounce of the brake pedal.

* * * * *